United States Patent
Bleck et al.

(10) Patent No.: US 6,513,989 B1
(45) Date of Patent: Feb. 4, 2003

(54) FERRULE CONTAINER FOR HOLDING A MULTIPLE OPTICAL FIBER DISPOSED IN A FERRULE, AND A CONNECTOR FOR CONNECTING MULTIPLE OPTICAL FIBERS

(75) Inventors: Oliver Bleck, München (DE); Helge Schmidt, Speyer (DE)

(73) Assignee: Tyco Electronics Logistics AG, Steinach (CH)

( * ) Notice: Subject to any disclaimer, the term of this patent is extended or adjusted under 35 U.S.C. 154(b) by 0 days.

(21) Appl. No.: 09/472,219

(22) Filed: Dec. 27, 1999

Related U.S. Application Data

(63) Continuation of application No. PCT/DE98/01479, filed on May 29, 1998.

(30) Foreign Application Priority Data

Jun. 24, 1997 (DE) ........................................ 197 26 854

(51) Int. Cl.[7] ................................................ G02B 6/38
(52) U.S. Cl. ............................ 385/60; 385/72; 385/78
(58) Field of Search ........................ 385/53–55, 58–60, 385/70–72, 77–78

(56) References Cited

U.S. PATENT DOCUMENTS

| | | |
|---|---|---|
| 4,725,120 A | 2/1988 | Parzygnat |
| 5,216,732 A | 6/1993 | Knott |
| 5,542,015 A * | 7/1996 | Hultermans .................. 385/60 |
| 5,588,079 A | 12/1996 | Tanabe et al. ................ 385/78 |
| 5,600,747 A | 2/1997 | Yamakawa et al. ........... 385/59 |
| 5,689,598 A | 11/1997 | Dean, Jr. et al. ............. 385/59 |
| 5,712,938 A * | 1/1998 | Lin et al. ...................... 385/59 |
| 5,796,896 A * | 8/1998 | Lee .............................. 385/59 |
| 5,930,426 A * | 7/1999 | Harting et al. ............... 385/56 |
| 5,960,138 A * | 9/1999 | Shimoji et al. ............... 385/58 |

FOREIGN PATENT DOCUMENTS

| | | |
|---|---|---|
| EP | 0 696 748 A2 | 2/1996 |
| EP | 0 718 652 A2 | 6/1996 |
| EP | 0 807 837 A1 | 11/1997 |
| GB | 2 303 939 A | 3/1997 |
| WO | WO 97/34176 | 9/1997 |

OTHER PUBLICATIONS

"A High Density Optical Backplane Connector" (Melchior et al.), IEEE, Electronics Components and Technology Conference, 1996, pp. 453–55. (May).
"Design and Performance of a Multifiber Backpanel Type Connector" (Takaya et al.), IEEE Photonics Technology Letters, vol. 8, No. 5, May 1996, pp. 655–57.

* cited by examiner

Primary Examiner—Rodney Bovernick
Assistant Examiner—Michael J. Stahl
(74) Attorney, Agent, or Firm—Laurence A. Greenberg; Werner H. Stemer; Ralph E. Locher

(57) ABSTRACT

A ferrule container for holding a plurality of ferrules retaining a multiplicity of optical fibers. The ferrule container includes outer walls defining a plurality of parallel ferrule passageways for holding a plurality of ferrules, and a ferrule holder including a spring holder and a compression spring. The spring holder and one of the outer walls are formed with mutually cooperating structure including a latching nose and a latching nose opening cooperating to orient and hold the spring holder in at least one of the ferrule passageways. A connecting configuration is also provided for connecting a multiplicity of optical fibers including a board housing with a first ferrule and a bushing housing with a second ferrule. The first ferrule and the bushing housing are constructed such that they can be intermated on a carrier plate in such a way that the board can be displaced to a large extent with reference to the carrier plate without having a negative effect on a connection between a ferrule on the board and a ferrule on the carrier plate.

22 Claims, 8 Drawing Sheets

FERRULE CONTAINER FOR HOLDING A MULTIPLE OPTICAL FIBER DISPOSED IN A FERRULE, AND A CONNECTOR FOR CONNECTING MULTIPLE OPTICAL FIBERS

CROSS-REFERENCE TO RELATED APPLICATION

This is a continuation of copending International Application PCT/DE98/01479, filed May 29, 1998, which designated the United States.

BACKGROUND OF THE INVENTION

FIELD OF THE INVENTION

The invention relates to a ferrule container for holding a multiple optical fiber disposed in a ferrule, and to a connecting configuration for connecting multiple optical fibers.

Rising data rates and transmission bandwidths are increasingly being implemented in modern data communications and telecommunications. The limits of performance of purely electronic systems have already been reached. In order to be able to handle the data rates that will be required in the future, operations are turning more and more to optical transmission systems. Thus far, individual fiber connections have been the prevailing way of approaching a solution for these systems, since previously lasers that were used could only be produced as individual components. With modern lasers, cost-effective, so-called laser arrays can be produced and tested, so that there is an increasing shift in optical transmission systems from serial transmission to parallel transmission.

Existing ferrule containers and connecting configurations for connecting multiple optical fibers are disadvantageous because only low packing densities can be achieved. Moreover, electric connector systems cannot be integrated in the existing connecting configurations. Finally, the flexibility of the existing connecting configurations is limited, and this necessitates complicated configurations to enable simultaneous connection of optical conductors arriving with different orientations.

SUMMARY OF THE INVENTION

It is accordingly an object of the invention to provide a ferrule container and a connector for connecting optical fibers, which overcomes the above-mentioned disadvantageous of the heretofore-known devices of this general type.

It is therefore an object of the invention to provide a ferrule container and a connector for connecting multiple optical fibers so that a high packing density can be obtained.

Furthermore, the aim is to achieve a high flexibility, in which case optical and electrical connections are to be provided as far as possible in one system. A simple connection of multiple optical fibers is also to be ensured, the aim being to observe the narrow tolerances for optical connections.

With the foregoing and other objects in view there is provided, in accordance with the invention, a ferrule container for holding a plurality of ferrules retaining a multiplicity of optical fibers. The ferrule container includes outer walls defining a plurality of parallel ferrule passageways for holding a plurality of ferrules, and a ferrule holder including a spring holder and a compression spring. The spring holder and one of the outer walls are formed with mutually cooperating structure including a latching nose and a latching nose opening cooperating to orient and hold the spring holder in at least one of the ferrule passageways.

In accordance with an added feature of the invention, the ferrule container is constructed such that a plurality of optical fibers respectively disposed in ferrules can be held. Because of this configuration, a high packing density can be obtained, since a single ferrule container is already sufficient enough for connecting a plurality of multiple optical fibers. It is advantageously possible to hold both ferrules with multiple fibers and ferrules with single fibers together in the ferrule container according to the invention. It is also conceivable, furthermore, to accommodate both optical and electrical connections together in one ferrule container.

In accordance with an additional feature of the invention, the ferrule container according to the invention advantageously has ferrule passageways or shafts extending parallel to one another for holding the ferrules. The ferrule shafts have at least in each case one, in particular operable, ferrule holding device for fixing the ferrules.

In accordance with another feature of the invention, the ferrule holding device is subdivided into a spring holder which can be held in a ferrule shaft, into a compression spring, and into spring holder latching noses provided in the holding shaft. The spring holder latching noses advantageously being of operable construction. With the aid of such a ferrule holding device, it is possible for a ferrule to be fastened in the ferrule container in a particularly simple fashion. The provision of a compression spring acting on the ferrule ensures backlash compensation. To be specific, the compression spring is disposed between the ferrule and the spring holder such that the ferrule is pressed by the compression spring against a stop in the ferrule shaft. If the free end face of the ferrule comes into contact with the free end face of the multiple optical fibers of a further ferrule, the ferrule can escape rearward into the ferrule container against the deformation of the compression spring and compensate for positional inaccuracies in this way.

If the spring holder latching noses are constructed in an operable fashion, the ferrule can be removed from the ferrule container in a simple way. On the other hand, it is possible in a simple way for a ferrule to be mounted in the ferrule container with the aid of the ferrule container thus constructed.

In accordance with a further feature of the invention, the ferrule container has on the outside, locking elements which are constructed such that the ferrule container can be fixed, particularly detachably, in a board housing or in a connecting housing. As a result, it is possible to achieve a firm connection between the ferrule container and a board housing or a connecting housing. When a connecting housing is provided, reliable connections that can quickly be loosened are achieved between multiple optical fibers with an extremely high packing density.

In accordance with yet an added feature of the invention, a plurality of ferrule shafts are provided with a rectangular inner shape. Two ferrule shafts can then be disposed such that one of their longer inner edges are in each case situated directly next to one another. The result is a ferrule container with a particularly high packing density. In this case, the ferrule container essentially has a square outer shape in cross section. Consequently, it is possible to achieve a standardized design of the ferrule container according to the invention, with the result that connecting configurations of a modular type can be assembled in a simple way. Precisely in the case of a ferrule container with an essentially square cross section, it is advantageous when outside of the ferrule container are provided ferrule container coding elements which are constructed such that they can be used to establish an insertion direction of the ferrule container in a board housing or in a connecting housing. It is therefore possible to avoid mounting errors from the very start in a simple way if the correct orientation is established as early as when designing a connecting configuration.

In accordance with yet an additional feature of the invention, the ferrule container can also have a rectangular outer shape. Consequently, of a total of four possible positions of the ferrule container in a connecting element only two orientations are left, resulting in a particularly simple coding.

Again, by providing appropriate coding elements it is also possible for the ferrule container to be coded in terms of direction on the board side, on the side of the cable plug and/or, in particular, also on the side of the spring holder if present.

In accordance with yet another feature of the invention, a shield against electromagnetic influences is also provided in the region of the plug-in shaft or the plug-in shafts and/or in the region outside of the ferrule container. It is precisely in the case of combined provision of electrical and optical connections that a reliable shielding is thereby ensured for the electrical connections, and that trouble-free operation of the ferrule container is ensured.

In accordance with yet a further feature of the invention, the ferrule container according to the invention has in the region of an end face, at least one guide bore into which a guide pin can be inserted. In this way, a plurality of ferrules can be aligned with one another via a single pair of guide pins/guide bores.

In accordance with still a further feature of the invention, up to two multiple fiber ferrules can be installed in a ferrule container. It is particularly advantageous in this case that trouble-free functioning of a connecting configuration with two ferrules which are to be intercoupled in each case requires only one ferrule shaft to be fitted with the two ferrule containers necessary therefor. In this way, a maximum packing density of the optical conductors is combined with a maximum flexibility with regard to the use of the ferrule containers according to the invention.

With the foregoing and other objects in view there is also provided, in accordance with the invention, a connector for connecting optical fibers that includes a ferrule container for holding a first ferrule having an end face and retaining a multiplicity of optical fibers, a board housing for holding the ferrule container, and a bushing housing for holding a second ferrule having an end face and retaining a multiplicity of optical fibers. The board housing and the bushing housing are constructed to mate in a mating state for connecting the first ferrule and the second ferrule such that the end face of the first ferrule bears against the end face of the second ferrule. The connector also includes a first locking device for detachably connecting the ferrule container to the board housing, and a second locking device for detachably connecting the ferrule container to the bushing housing. The first locking device is constructed to be in a loosened condition and the second locking device is constructed to be in a locked condition when the board housing and the bushing housing are in the mating state. The first locking device is constructed to be in a locked condition when the board housing and the bushing housing are not in the mating state.

It is possible with this connector to produce a high packing density simultaneously with a large tolerance margin. This is important, in particular, in the case of applications in which a device of modular construction is used with a plurality of plug-in printed circuit board modules and a common carrier plate for the plug-in printed circuit board modules. It must be possible for the printed circuit boards to be interconnected and connected to the outside optically and, if appropriate, also electrically. The person skilled in the art denotes the plane of the carrier plate of the individual printed circuit boards as "backplane", while the plane of a plug-in printed circuit board module is denoted as "board". In this case, the invention is based on the finding, essential to the invention, that it is very important to split up the connector into the components of a "ferrule container", "board housing" and the "bushing housing", attached in the region of the backplane, for such a tolerance compensation. To be precise, it is possible by such a splitting up of the individual parts to achieve a firm connection between a ferrule container and the printed circuit board during transportation of a plug-in printed circuit board module. This is because the ferrule container is connected to the board housing. When the plug-in printed circuit board module is introduced onto the carrier plate with the bushing housing provided thereon, it is then possible to make a firm connection between the ferrule container and the bushing housing, while the connection between the ferrule container and board housing is undone. As a result, the printed circuit board can be displaced to a large extent with reference to the carrier plate without having a negative effect on a connection between a ferrule on the board side and a reciprocal ferrule.

In accordance with an added mode of the invention, the connecting configuration according to the invention can also be used to make a reliable overhung connection between multiple optical conductors which can nevertheless be quickly loosened. Connecting configurations which can be loosened and are operable in a simple way can be produced by splitting up the connecting configuration into a ferrule container, a board housing and a bushing housing. The connection between a ferrule container disposed on a board housing and a ferrule container disposed on the bushing housing is made and undone again by virtue of the fact that the board housing is moved inside the bushing housing in order to interlock the two ferrule containers.

In accordance with an additional mode of the invention, there is provided a first locking device, which can be loosened, for providing a force-closed connection of the first ferrule container and board housing, and a second locking device, which can be loosened, for providing a force-closed connection of the first ferrule container and the bushing housing. In this case, "which can be loosened" means that it is possible to switch between a locked and a loosened state of the first ferrule container in the board housing and in the bushing housing, respectively. In the locked state, the result is an essentially firm connection between the ferrule container and board housing and the bushing housing, respectively. In the loosened state of the locking device the ferrule container can essentially move freely inside the board housing and inside the bushing housing, respectively.

In accordance with another mode of the invention, in the inter-mated state of the board housing and bushing housing, the first locking device is in the loosened state and the second locking device is in the locked state. In the mutually separated state of the board housing and bushing housing, the first locking device is in the locked state. The second locking device does not come into action in the mutually separated state of the board housing and bushing housing.

It is advantageous in this case that the first locking device is constructed such that it can be brought from a loosened state into a locked state by a movement of the board housing in the direction away from the bushing housing. It also being possible, in particular, for this to be performed automatically in the course of the movement of the board housing. In the case of a movement of the board housing in the direction toward the bushing housing, by contrast, the first locking device can advantageously be brought into a loosened state. It also being possible for this to be performed automatically solely on the basis of the movement of the board housing in the direction toward the bushing housing. These refinements ensure that in the separated state of the board housing and bushing housing, the first locking device is in the locked state, whereas in the case of the inter-mated state of the board housing and the bushing housing, the first locking device is in the loosened state.

In accordance with a further mode of the invention, the second locking device is preferably constructed such that it can be brought into a locked state by a movement of the board housing in the direction toward the bushing housing, and thus that it makes a firm connection between the first ferrule container and bushing housing. It is provided in this case that the second locking device automatically goes over into a locked state when the board housing is moved in the direction toward the bushing housing. By contrast, in the case of a movement of the board housing in the direction away from the bushing housing, the second locking device is brought into a loosened state. The previous operations of the second locking device are provided, in particular, in this case such that they are performed automatically in the case of a movement of the board housing.

In accordance with a concomitant mode of the invention, for the purpose of latching the first locking device, snap-action hooks are provided in the region of the ferrule container, and board housing latching noses are provided in the region of the board housing. Furthermore, the first locking device can have first ejector noses provided in the region of the bushing housing. This promotes automated operation and/or automated loosening of the first locking device.

Likewise, the second locking device can have snap-action hooks provided in the region of the ferrule container, and bushing housing latching noses can be provided on the side of the bushing housing. It is also possible to provide second ejector noses in the region of the bushing housing as well in order to loosen the second locking device.

Automated operation of the second locking device is ensured by the above construction. A particularly simple connecting configuration results in this case if the snap-action hooks of the second locking device and the run-up steps are formed by the same structures.

The invention described here permits the design of an optical connector system with a very high packing density. It is possible in this case both to design the invention as a stand-alone solution, and to integrate the invention into already existing electrical systems. The tolerances occurring in electrical connector systems are absorbed in such a way that the tolerances necessary for optical connections can be obtained. In addition, owing to its modular and symmetrical design, the invention offers the possibility of being able to cover all applications occurring in practice. The solution according to the invention provides a connector or a connecting configuration which is capable of ensuring both the large axial tolerances of several millimeters for electrical systems, and the low axial tolerances of a few micrometers for optical connections. As a result, even instances of sagging inside the backplane can be compensated, resulting in an extremely high packing density.

Other features which are considered as characteristic for the invention are set forth in the appended claims.

Although the invention is illustrated and described herein as embodied in a ferrule container for holding a multiple optical fiber arranged in a ferrule, and a connecting arrangement for connecting multiple optical fibers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
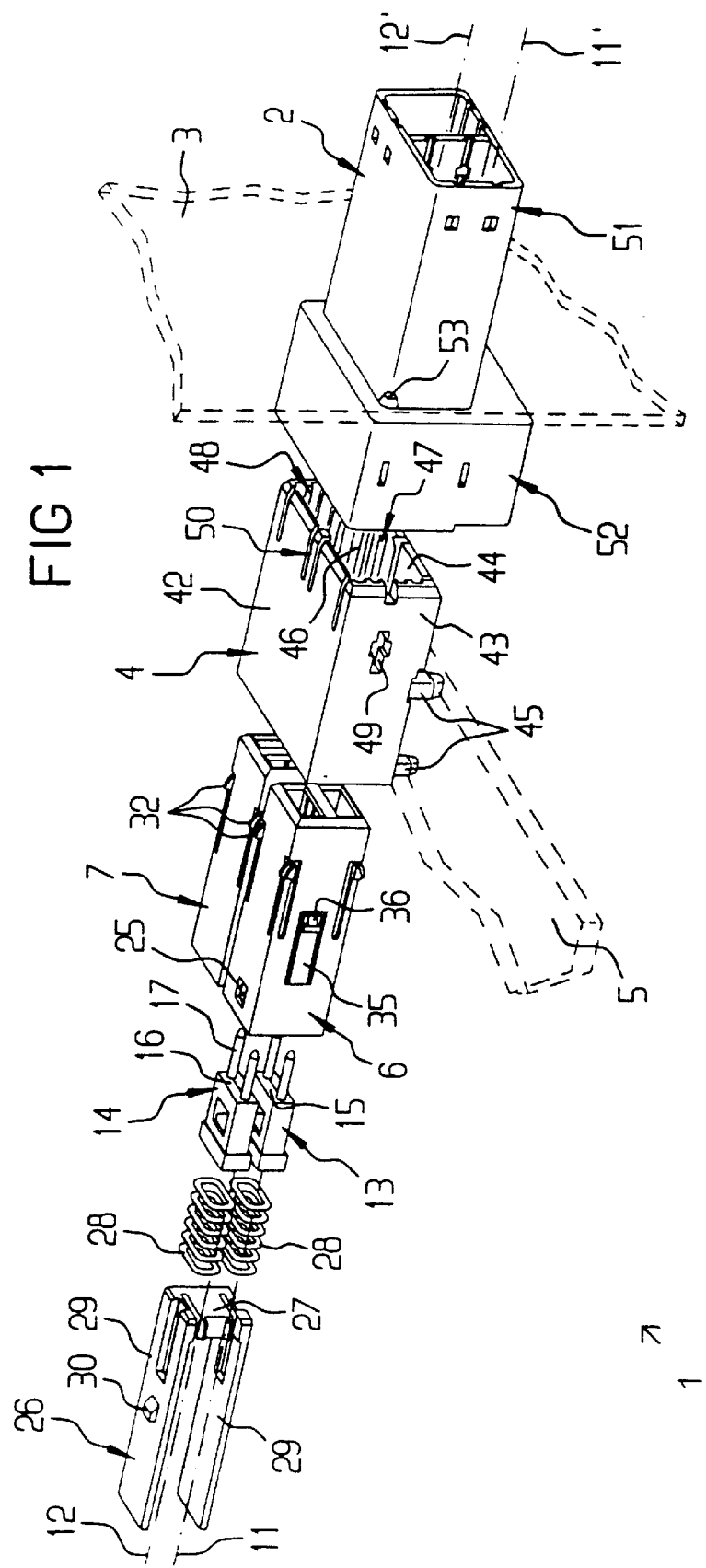
FIG. 1 shows an exploded perspective representation of a connecting configuration with two ferrule containers.

Referring now to the figures of the drawing in detail and first, particularly, to FIG. 1 thereof, there is seen an exploded perspective representation of a connecting configuration 1. The connecting configuration 1 is subdivided into a connector or bushing housing 2, which is disposed on a carrier plate 3, a board housing 4, which is disposed on a printed circuit board 5, a first ferrule container 6, and a second ferrule container 7. The connecting configuration 1 serves to connect a first multiple optical conductor 11 to a second multiple optical conductor 11', as well as a third multiple optical conductor 12 to a fourth multiple optical conductor 12', which are represented in each case only by a line of symmetry.

The first ferrule container 6 is constructed such that it can hold the first multiple optical conductor 11 and the third multiple optical conductor 12. The individual fibers are held at the end of the first multiple optical conductor 11 and at the end of the third multiple optical conductor 12 next to one another in a first ferrule 13 and in a second ferrule 14. Specifically, the end faces of the individual fibers terminate flush with a first end face 15 of the first ferrule 13, and respectively, with a second end face 16 of the second ferrule 14. Furthermore, guide pins 17 are provided in the first end face 15 and in the second end face 16, with the first ferrule 13 having two guide pins 17, and with the second ferrule 14 likewise having two guide pins 17. Only one of the four guide pins 17 is designated with the reference numeral in the drawing. The projecting ends of the individual fibers of the first multiple optical conductor 11 and of the third multiple optical conductor 12 are indicated in the drawing only as thin points which extend in each case between the guide pins 17 inside the first ferrule 13 and inside the second ferrule 14.

Transverse to the extent of the first multiple optical conductor 11 and the third multiple optical conductor 12, the first ferrule 13 and the second ferrule 14 in each case have a rectangular cross section. The second multiple optical conductor 11' and the fourth multiple optical conductor 12' likewise have ferrules, but these are not represented in this view.

The first ferrule container 6 holds the first ferrule 13 and the second ferrule 14. The first ferrule container 6 has an essentially cuboid outer shape, and in the interior has a lower ferrule passageway or shaft 20 and an upper ferrule passageway or shaft 21, that can be better seen in FIG. 2. The lower ferrule shaft 20 and the upper ferrule shaft 21 extend situated one above another in the longitudinal direction of the first ferrule container 6. The lower ferrule shaft 20 has a lower ferrule exit opening 22, while the upper ferrule shaft 21 has an upper ferrule exit opening 23. In the inserted state of the first ferrule 13 in the lower ferrule shaft 20, the first end face 15 projects from the lower ferrule exit opening 22. In the inserted state of the second ferrule 14 in the upper ferrule shaft 21, the second end face 16 projects from the upper ferrule exit opening 23. In the region of an upper boundary wall 24, a latching nose opening 25 with a square contour is introduced adjacent the end of the first ferrule container 6 remote from the upper ferrule exit opening 23. An identical latching nose opening (not shown) is located in the lower boundary wall of the lower ferrule shaft 20, specifically exactly opposite the shown latching nose opening 25.

The function of the latching nose opening 25 can be seen in conjunction with a spring holder 26 represented in FIG. 1. In the inserted state of the first ferrule 13 and the second ferrule 14 in the first ferrule container 6, an end face 27 of the spring holder 26 presses compression springs 28. One compression spring 28 presses the first ferrule 13 in the direction of the lower ferrule exit opening 22 and the other compression spring presses the second ferrule 14 in the direction of the upper ferrule exit opening 23. In order to fix the spring holder 26 in the first ferrule container 6, two limbs 29 are provided which extend rearward in a U-shaped fashion starting from the end face 27. The outside surfaces of the limbs 29 have spring holder latching noses 30 which project toward the boundary wall of the first ferrule container 6. Only the upper spring holder latching nose 30 is shown in FIG. 1. In the fully inserted state of the spring holder 26 in the first ferrule container 6, the spring holder latching noses 30 latch in the latching nose openings 25. In this case, the compression springs 28 are pressed together, with the result that the first ferrule 13 and the second ferrule 14 are held in the exit openings 22 and 23 with a bias. When dismantling the first ferrule container 6, the spring holder latching noses 30 are pressed with the aid of a tool from the latching nose openings 25, whereupon the spring holder 26 can be removed from the first ferrule container 6.

Figure 2:
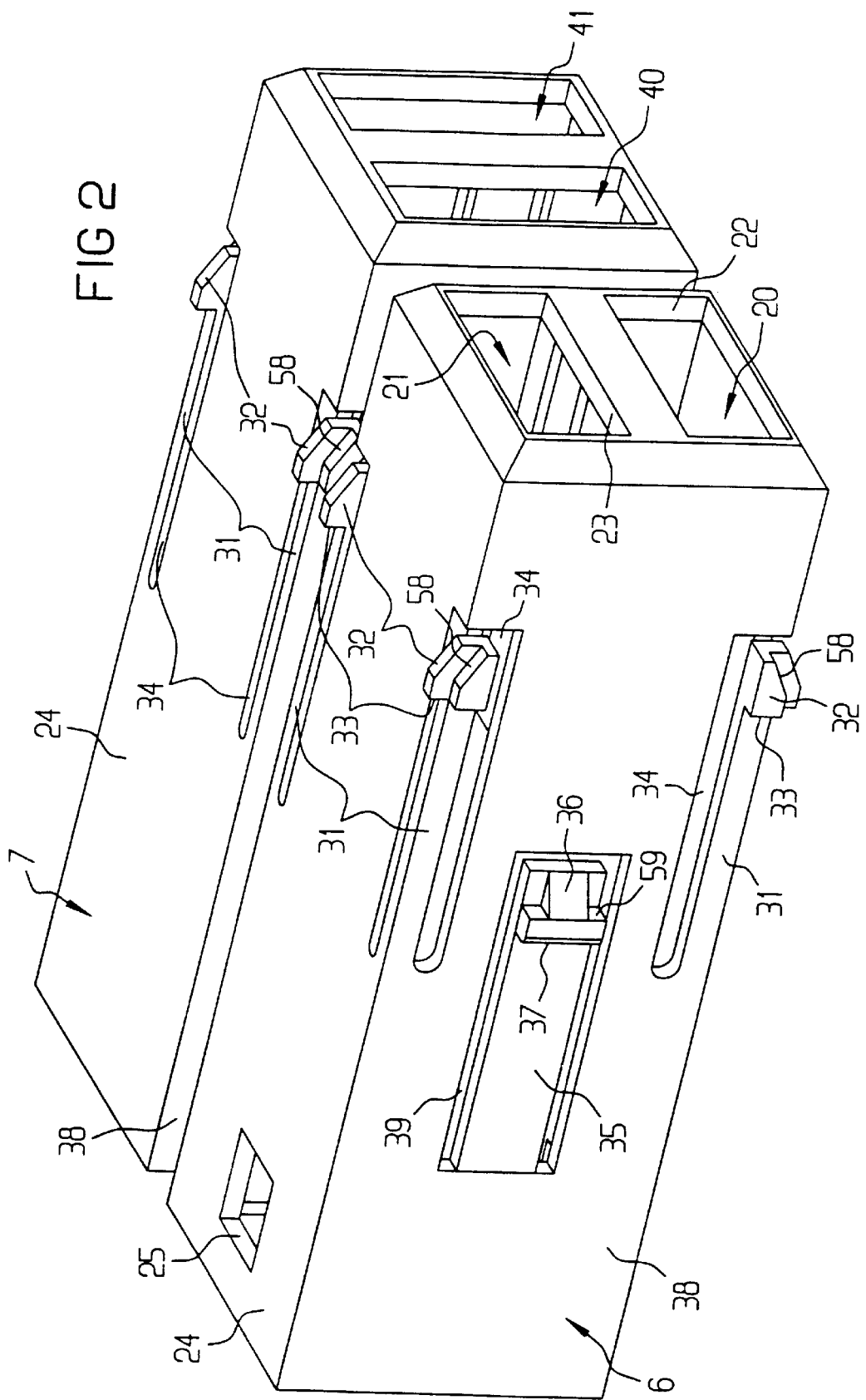
FIG. 2 shows a perspective representation better illustrating details of the ferrule containers shown in FIG. 1.

As is best seen in FIG. 2, the first ferrule container 6 has on its longer outer edges a total of four spring tongues 31 which extend in the longitudinal direction of the ferrule container 6 and whose ends can move transverse to the longitudinal direction of the ferrule container 6. Snap-action hooks 32 are provided on the ends of the spring tongues 31 and each spring tongue 31 has a latching edge 33 directed rearward toward the latching nose opening 25. The snap-action hooks 32 taper forward in the direction of the exit openings 22 and 23.

The snap-action hooks 32 are constructed in this case such that in the state of rest which is shown in FIG. 2 they project with their outer edges above the external surfaces of the lateral boundary surfaces of the first ferrule container 6. Furthermore, they are constructed such that when the snap-action hooks 32 are loaded transverse to the longitudinal direction of the first ferrule container 6, the spring tongues 31 yield, with the result that the snap-action hooks 32 engages in a respective edge opening 34 in the first ferrule container 6.

Finally, the first ferrule container 6 also has a lateral spring tongue 35 with a lateral snap-action hook 36. At its rear end, the lateral snap-action hook 36 has a lateral latching edge 37, and runs forward in a tapering fashion. The lateral snap-action hook 36 projects over the external surface of a lateral boundary wall 38 of the first ferrule container 6, and can be pressed by a force acting thereon into a lateral opening 39 provided in the lateral boundary wall 38. In this case, a further lateral spring tongue (not represented in this view) is also provided with a lateral spring tongue having a lateral snap-action hook which corresponds essentially to the shown lateral spring tongue 35 with the lateral snap-action hook 36. The snap-action hooks 36 have the same geometry and dimension, but are attached to opposite sides in each case.

The second ferrule container 7 corresponds essentially to the first ferrule container 6. As is best to be seen in the representation in FIG. 2, the second ferrule container 7 does not, however, have an upper and/or a lower ferrule shaft, but rather has a left-hand ferrule passageway or shaft 40 and a right-hand ferrule passageway or shaft 41. The dimensions of the left-hand ferrule shaft 40 and the right-hand ferrule shaft 41 correspond to the dimensions of the lower ferrule shaft 20 and the upper ferrule shaft 21. However, the alignment of the left-hand ferrule shaft 40 and the right-hand ferrule shaft 41 is rotated with reference to the longitudinal axis of the second ferrule container 7 by 900 with respect to the alignment of the lower ferrule shaft 20 and the upper ferrule shaft 21 in the first ferrule container 6.

Otherwise, identical components of the same ferrule container 7 are given reference numerals identical to those of the first ferrule container 6. In particular, the second ferrule container 7 has a lateral boundary wall 38 which has a lateral spring tongue with a lateral snap-action hook and a lateral latching edge, which correspond identically to the lateral spring tongue 35, the lateral snap-action hook 36 and the lateral latching edge 37 of the first ferrule container 6 in regard to the position, alignment, and dimensions. These components are not represented in FIG. 2 or FIG. 1. The upper boundary wall 24 of the second ferrule container 7, however, does not have a latching nose opening. The latching nose opening of the second ferrule container 7 is, rather, located at a corresponding position in a lateral boundary wall 38 and in the opposite lateral boundary wall of the second ferrule container 7. The particular configuration of the lateral spring tongues 35 in the first ferrule container 6 and in the second ferrule container 7 codes them in terms of orientation.

The board housing 4 is best seen in FIG. 1. The board housing 4 is constructed as an essentially cuboid housing which has an upper wall 42 and two mutually symmetrical side walls 43. Constructed on the underside of a lower wall 44 are four plug pins 45 with the aid of which the board housing 4 is pressed firmly into corresponding openings in the printed circuit board 5. The end walls of the board housing 4 are open toward both sides. The cavity that is located in the interior of the board housing 4 is surrounded by the walls 42, 43 and 44 and is split up by a middle wall 46 into a first through channel 47 and a second through channel 48. The first through channel 47 and the second through channel 48 are dimensioned such that the first ferrule container 6 can be held in the first through channel 47, while the second ferrule container 7 can be held in the second through channel 48.

Lateral latching nose openings 49 are provided in the side walls 43 and in the middle wall of the board housing 4. In the view shown in FIG. 1, only the lateral latching nose opening 49 in the first through channel 47 can be seen. Stationary board housing ejector structures 50 are constructed on the top side of the board housing 4 and on inner edges of the first and second through channels 47, 48.

The lateral latching nose openings 49 are constructed such that in the inserted state of the first and second ferrule containers 6 and 7 they interact with the lateral snap-action hooks 36. In contrast, the board housing ejector structures 50 are constructed such that they cooperate with the snap-action hooks 32 situated on top in a state when the first and second ferrule containers 6, 7 are inserted into the first through channel 47 and the second through channel 48.

The connector or bushing housing 2 is subdivided into a ferrule region 51 and a board holding region 52 that in each case inherently have a cuboid outer shape of different size. The ferrule region 51 which is intended for holding the second multiple optical conductor 11' and the fourth multiple optical conductor 12' is kept smaller, in cross section transverse to the course of the multiple optical conductors 11' and 12' than the board holding region 52. In the transition region between the ferrule region 51 and the board holding region 52, the bushing housing 2 has a plug pin 53 which is pressed into a corresponding opening (not shown) in the carrier plate 3. A further plug pin (not shown) is provided that is diagonally offset relative to the plug pin 53 on the bushing housing 2. In this case, the carrier plate 3 has an essentially rectangular opening whose contour corresponds essentially to the external dimensions of the ferrule region 51. This ensures the passage of the ferrule region 51 through the carrier plate 3.

The design of the board housing 4 and of the bushing housing 2 as well as the interaction of the ferrule containers 6, 7, the board housing 4, and the bushing housing 2 becomes even clearer by referring to FIGS. 3–8. These figures illustrate the plugging in and unplugging operation of the ferrule containers 6 and 7 that are guided in the board housing 4 and into the bushing housing 2.

Figure 3:
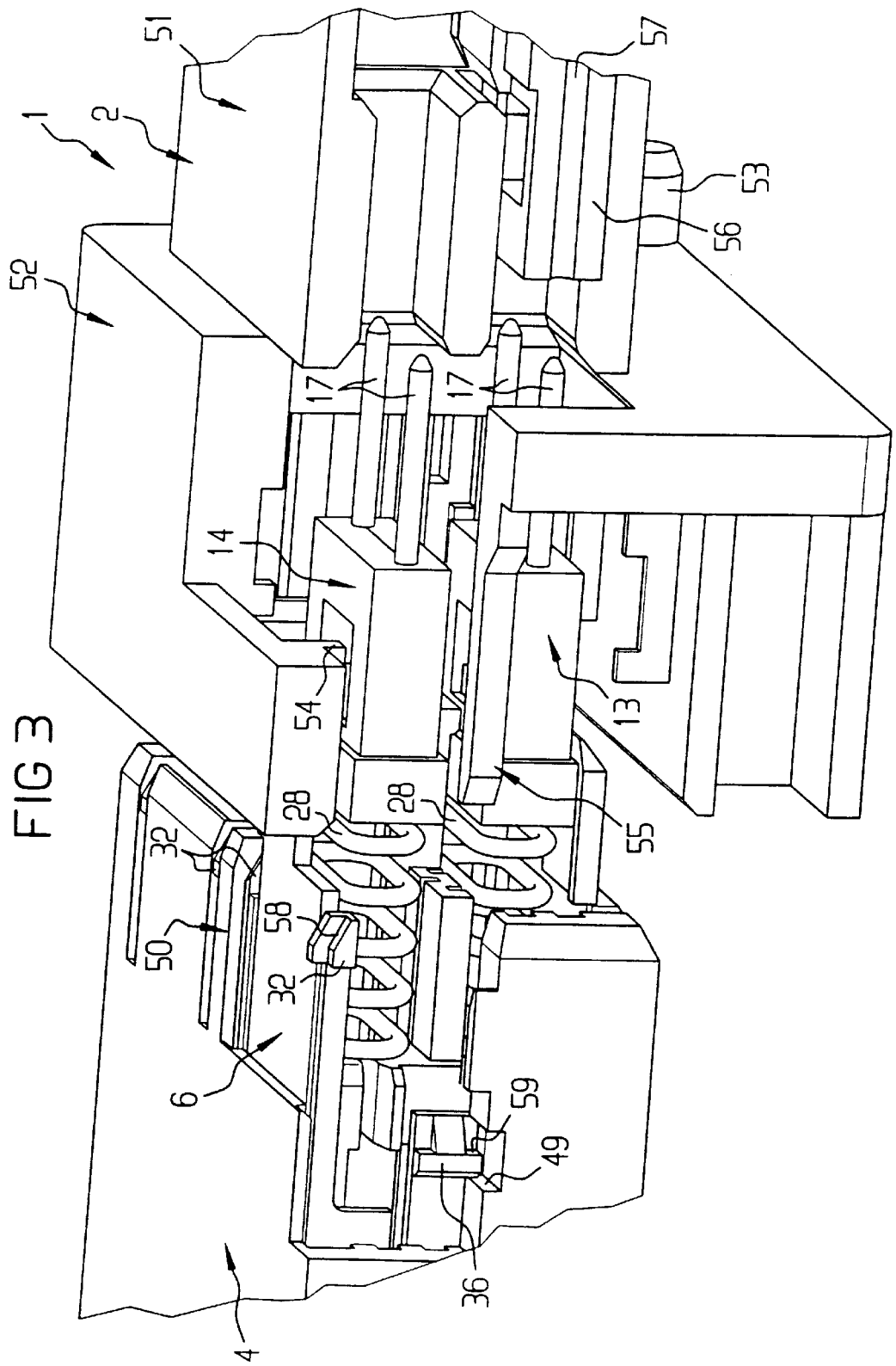
FIG. 3 shows a perspective representation of the connecting configuration shown in FIG. 1 in the unplugged state, the components of the connecting configuration being represented in a partially sectioned fashion.

As is best seen in FIG. 3, the inside of the bushing housing 2 has latching noses 54 and three bushing ejector structures 55. Only a single ejector structure 55 can be seen in FIG. 3, because the other bushing ejector structure, which is situated symmetrically opposite, is covered by other components. Situated between these bushing ejector structures 55 on the outside is a middle bushing ejector structure which ensures the release of the snap-action hooks of the ferrule containers which are situated on the "inside". The bushing latching noses 54 interact with corresponding snap-action hooks on the edges of the ferrule containers 6, 7, while the bushing ejector structure 55 acts on the lateral snap-action hooks 36 of the ferrule containers 6, 7. A third ferrule 56 is shown inserted into the ferrule region 51 in the representation shown in FIG. 3. A longitudinal section of the third ferrule 56 is shown in the region of a guide bore 57. In the assembled state of the third ferrule 56 with the first ferrule 13, the guide bore 57 holds a guide pin 17. The result is that the end faces of the third ferrule 56 and the first ferrule 13 are accurately positioned relative to one another, and this ensures a low insertion loss in the case of the optical connection of the individual fibers in the optical conductors 11 and 11'.

FIG. 3 shows the assembled system of the connecting configuration 1 from FIG. 1 in the as yet unplugged state. Sections are introduced here in order to be able to illustrate the operations. The ferrule container 6 is latched in this state in the lateral latching nose openings 49 in the board housing 4 with the aid of the lateral snap-action hooks 36.

When the board housing 4 fitted with the ferrule containers 6, 7 is inserted into the bushing housing 2, the snap-action hooks 32 of the ferrule containers 6, 7 latch into the latching noses 54 in the bushing housing 2. This latched state is represented in FIG. 4.

Figure 4:
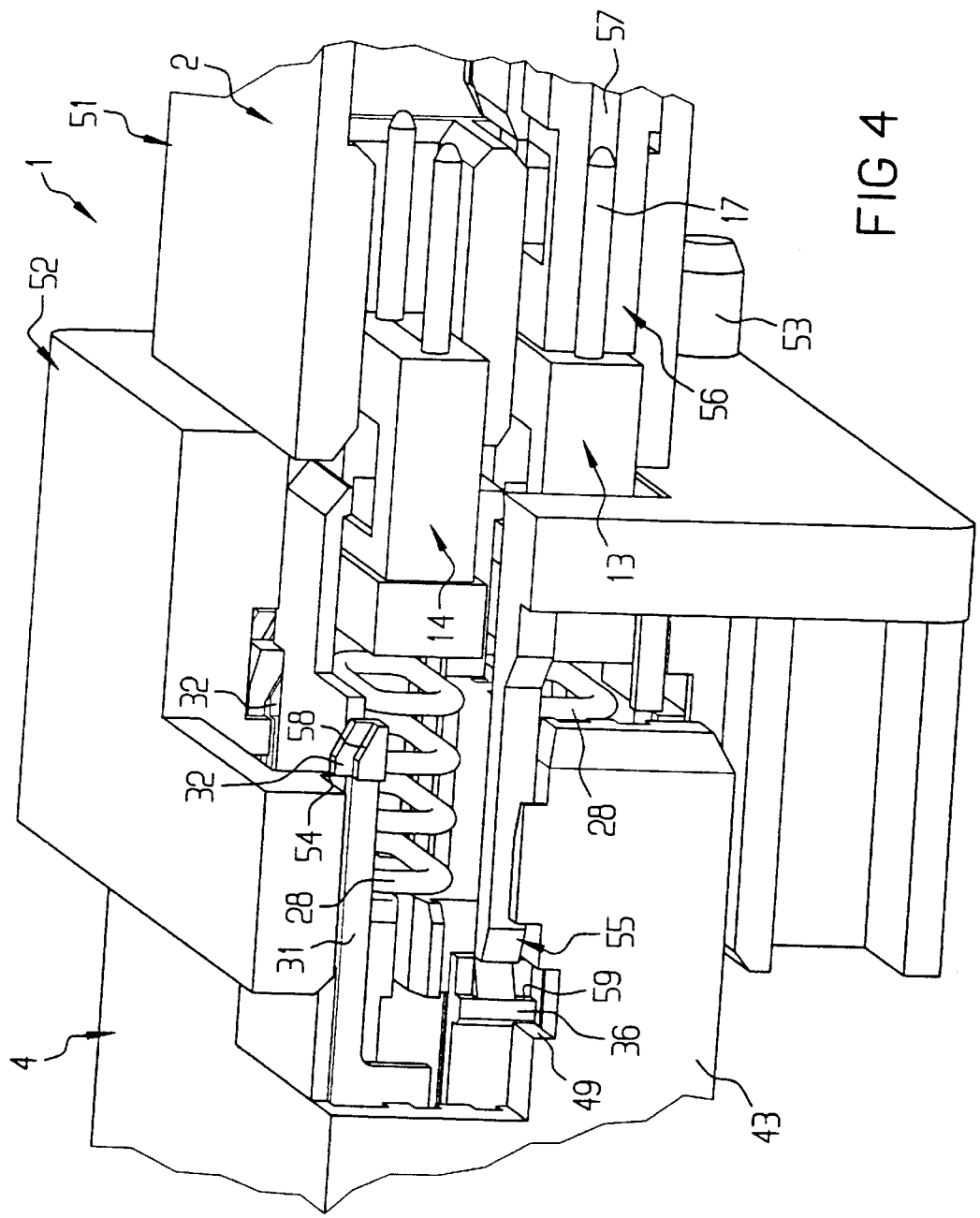
FIG. 4 shows the connecting configuration shown in FIG. 3 in the latched state.

As can be seen particularly well in FIG. 4, in this state the bushing ejector structures 55 bear precisely against the lateral snap-action hooks 36 of the ferrule container 6. In this state, the board housing ejector structures 50 bear precisely against the snap-action hooks 32 of the ferrule containers 6, 7, although this is not shown in FIG. 4.

Figure 5:
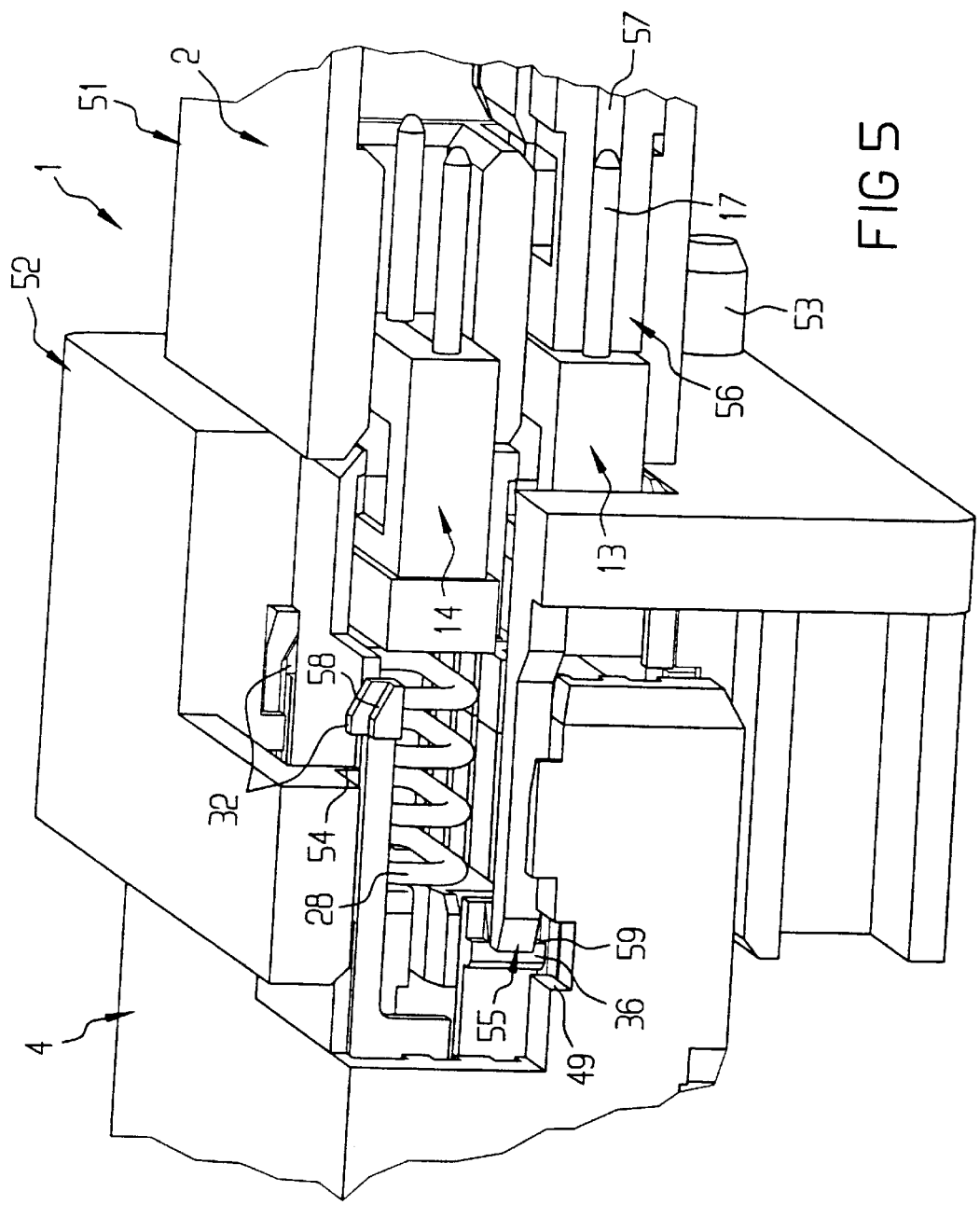
FIGS. 5–8 show the connecting configuration shown in FIG. 3 in various positions between a loosened and a latched state.

If the plugging operation is undertaken starting from FIG. 3 via the state in FIG. 4 is now carried out further by pushing the board housing 4 even further in the direction of the bushing housing 2, the lateral snap-action hooks 36 of the ferrule containers 6, 7 are pressed inward by the ejector structures 55 present in the bushing housing 2 until they disengage from the lateral latching nose openings 49, as can be seen particularly well in FIG. 5.

Figure 6:
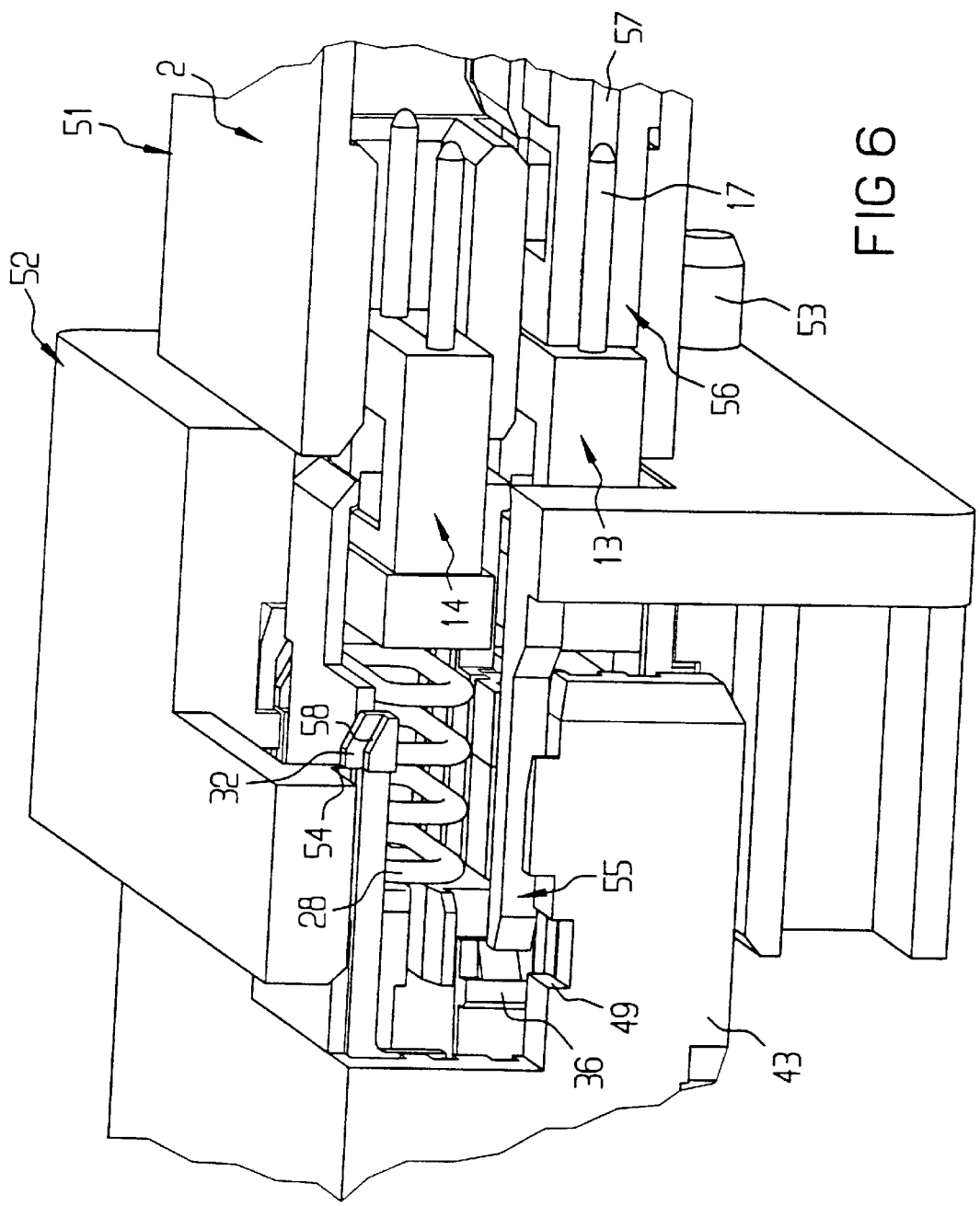

The longitudinal forces, in particular of the third ferrule 56 on the first ferrule 13, acting during insertion of the board housing 4 into the bushing housing 2 thereupon have the effect of pressing back the ferrule containers 6, 7 until the snap-action hooks 32 bear against the bushing latching noses 54. This state is best seen in FIG. 6. The lateral snap-action hooks 36 remain in a pressed-back position because of the action of the side wall 43, it being possible for the ferrule containers 6, 7 to move freely with reference to the board housing 4.

Consequently, the board housing 4 can move freely, together with the printed circuit board 5, with reference to the carrier plate 3 without the defined position of the multiple optical conductors 11, 11', 12, 12' relative to one another being varied.

Figure 7:
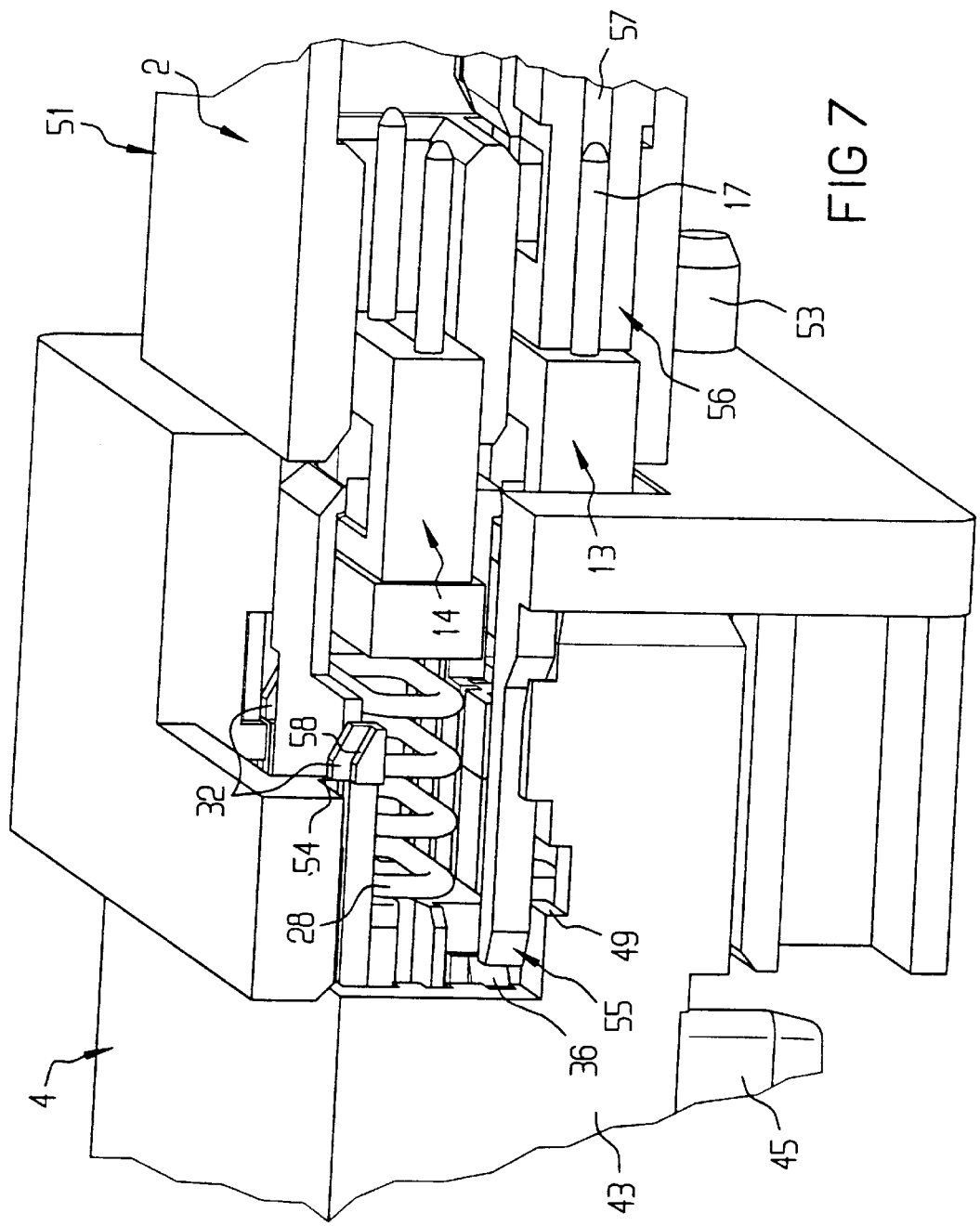

FIG. 7 shows the case of a maximum further movement of the board housing 4 in the direction of the bushing housing 2.

As long as the ferrule containers 6, 7 are latched in the bushing housing 2, the upper ends of the snap-action hooks 32 project through slots in the region of the board housing ejector structures 50. This state is better seen in FIG. 4, in which the spring tongues 31 are in a straight state.

Figure 8:
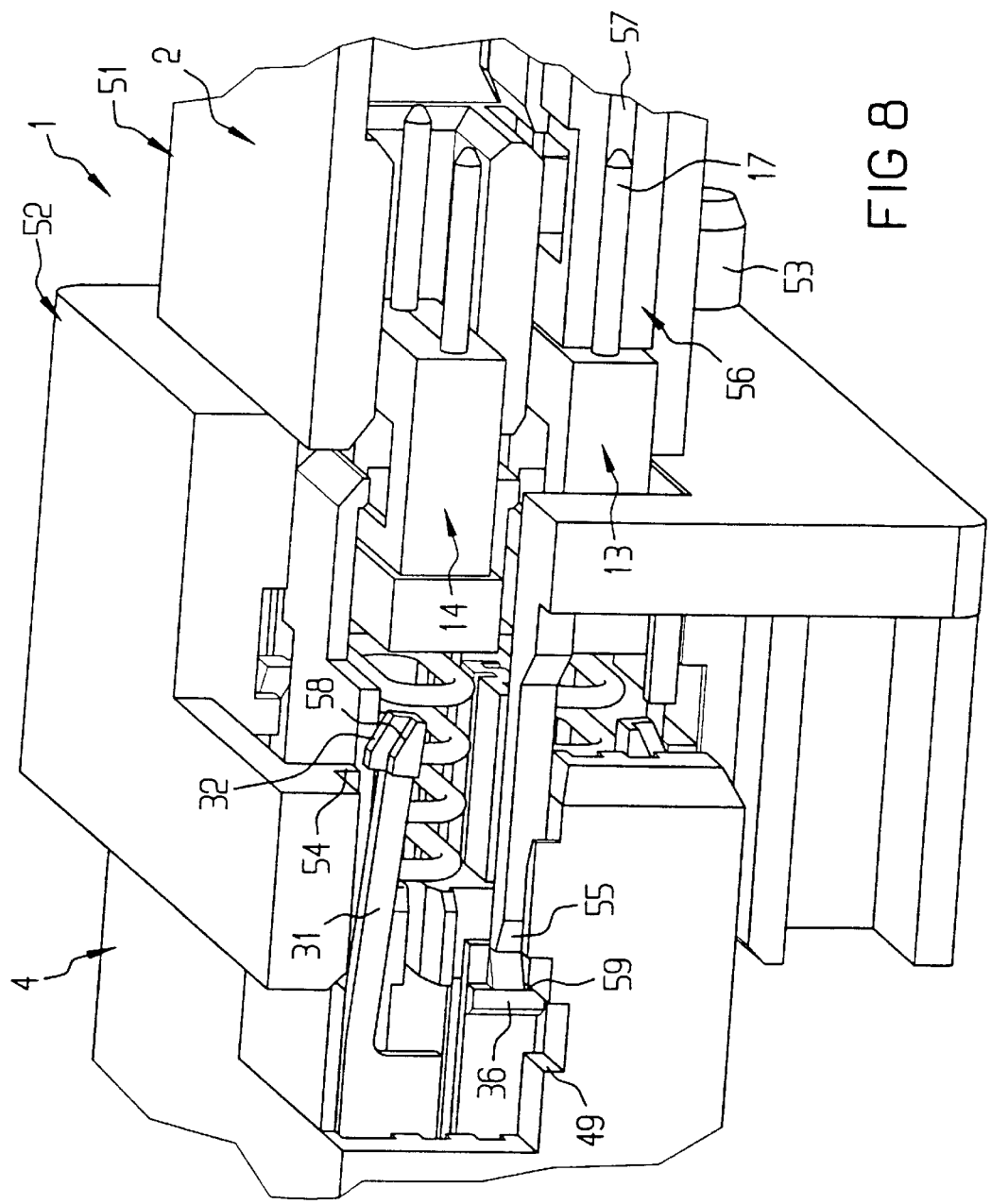

If the printed circuit board 5 is removed from the carrier plate 3 in the state in accordance with FIG. 4, the board housing 4 moves together with the printed circuit board 5 in a direction away from the bushing housing 2. In this case, the board housing ejector structures come into contact with run-up steps 58 provided in the region of the snap-action hooks 32, with the result that the snap-action hooks 32 are pressed inward as the spring clips 31 bend, as is best seen in FIG. 8. The snap-action hooks 32 are thereby loosened from the bushing latching noses 54.

At the same time, the lateral snap-action hooks 36 bear with a forwardly directed step 59 against a corresponding wall of the lateral latching nose opening 49, which prevents the ferrule container 6 from remaining in the bushing housing 2 upon extraction of the board housing 4 from the bushing housing 2. Moreover, when the board housing 4 is extracted in the state shown in FIG. 8, the ferrule container 6 is also moved with the board housing 4 because of the interaction of the step 59 with the lateral latching nose opening 49. After the extraction of the board housing 4 from the bushing housing 2, the connecting configuration 1 is once again in the state shown in FIG. 3.

The position of the ferrules 13, 14 and 56 relative to one another in the plugged-in state is decoupled from an enveloping housing such as the board housing by the latching mechanism described above. This permits a large tolerance compensation in conjunction with retention of the tolerances mandatory for the optical connection. This renders it possible to also provide, in addition to optical connections, electrical connections in the region of the connecting configuration 1. Such a provision requires larger tolerances.

A further advantage of the connecting configuration 1 consists in that the position of the ferrules 13, 14 and 56 are held relative to one another after latching, independent of the position of the printed circuit board 5 with reference to the carrier plate 3. The tolerance path to be compensated by the compression springs 28 is fixed at a defined maximum value in this way.

Furthermore, extremely high packing densities can be achieved with the aid of the connecting configuration 1.

We claim:

1. A connector for connecting optical fibers, comprising:
   a ferrule container for holding a first ferrule having an end face and retaining a multiplicity of optical fibers;
   a board housing for holding said ferrule container;
   a bushing housing for holding a second ferrule having an end face and retaining a multiplicity of optical fibers, said board housing and said bushing housing being constructed to mate in a mating state for connecting the first ferrule and the second ferrule such that the end face of the first ferrule bears against the end face of the second ferrule;
   a first locking device for detachably connecting said ferrule container to said board housing;
   a second locking device for detachably connecting said ferrule container to said bushing housing;
   said first locking device being constructed to be in a loosened condition and said second locking device constructed to be in a locked condition when said board housing and said bushing housing are in the mating state;
   said first locking device being constructed to be in a locked condition when said board housing and said bushing housing are not in the mating state; and
   said second locking device having ejector noses adjacent said bushing housing.

2. The connector according to claim 1, wherein said first locking device is constructed such that it can be brought from the loosened condition to the locked condition by a movement of said board housing in a direction away from said bushing housing.

3. The connector according to claim 2, wherein said first locking device is constructed such that during the movement, said first locking device is automatically brought into the locked condition.

4. The connector according to claim 1, wherein said first locking device is constructed such that it can be brought to the loosened condition by a movement of said board housing in a direction toward said bushing housing.

5. The connector according to claim 1, wherein said first locking device is constructed such that it is automatically brought to the loosened condition by a movement of said board housing in a direction toward said bushing housing.

6. The connector according to claim 1, wherein said second locking device is constructed such that it can be brought to the locked condition by a movement of said board housing in a direction towards said bushing housing.

7. The connector according to claim 6, wherein said second locking device is constructed such that during the movement, said second locking device is automatically brought into the locked condition.

8. The connector according to claim 1, wherein said second locking device is constructed such that it can be brought to a loosened condition by a movement of said board housing in a direction away from said bushing housing.

9. The connector according to claim 1, wherein said first locking device is constructed such that it is automatically brought to the loosened condition by a movement of said board housing in a direction away from said bushing housing.

10. The connector according to claim 1, wherein said first locking device has snap-action hooks adjacent said ferrule container, and has board housing latching noses adjacent said board housing.

11. The connector according to claim 1, wherein said first locking device has ejector noses adjacent said bushing housing.

12. A connector for connecting optical fibers, comprising:
    a ferrule container for holding a first ferrule having an end face and retaining a multiplicity of optical fibers;
    a board housing for holding said ferrule container;
    a bushing housing for holding a second ferrule having an end face and retaining a multiplicity of optical fibers, said board housing and said bushing housing being constructed to mate in a mating state for connecting the first ferrule and the second ferrule such that the end face of the first ferrule bears against the end face of the second ferrule;
    a first locking device for detachably connecting said ferrule container to said board housing;
    a second locking device for detachably connecting said ferrule container to said bushing housing;
    said first locking device being constructed to be in a loosened condition and said second locking device constructed to be in a locked condition when said board housing and said bushing housing are in the mating state;
    said first locking device being constructed to be in a locked condition when said board housing and said bushing housing are not in the mating state; and
    said second locking device having snap-action hooks adjacent said ferrule container, and having bushing housing latching noses adjacent said bushing housing.

13. The connector according to claim 12, wherein said first locking device is constructed such that it can be brought from the loosened condition to the locked condition by a movement of said board housing in a direction away from said bushing housing.

14. The connector according to claim 13, wherein said first locking device is constructed such that during the movement, said first locking device is automatically brought into the locked condition.

15. The connector according to claim 12, wherein said first locking device is constructed such that it can be brought to the loosened condition by a movement of said board housing in a direction toward said bushing housing.

16. The connector according to claim 12, wherein said first locking device is constructed such that it is automatically brought to the loosened condition by a movement of said board housing in a direction toward said bushing housing.

17. The connector according to claim 12, wherein said second locking device is constructed such that it can be brought to the locked condition by a movement of said board housing in a direction towards said bushing housing.

18. The connector according to claim 17, wherein said second locking device is constructed such that during the movement, said second locking device is automatically brought into the locked condition.

19. The connector according to claim 12, wherein said second locking device is constructed such that it can be brought to a loosened condition by a movement of said board housing in a direction away from said bushing housing.

20. The connector according to claim 12, wherein said first locking device is constructed such that it is automatically brought to the loosened condition by a movement of said board housing in a direction away from said bushing housing.

21. The connector according to claim 12, wherein said first locking device has snap-action hooks adjacent said ferrule container, and has board housing latching noses adjacent said board housing.

22. The connector according to claim 12, wherein said first locking device has ejector noses adjacent said bushing housing.

* * * * *